United States Patent
Takahashi et al.

(10) Patent No.: US 11,776,770 B2
(45) Date of Patent: Oct. 3, 2023

(54) SENSOR AND ELECTRONIC DEVICE

(71) Applicant: OMRON Corporation, Kyoto (JP)

(72) Inventors: Shunya Takahashi, Kyoto (JP);
Hirotaka Nakashima, Fukuchiyama (JP); Jumpei Nakamura, Kyoto (JP);
Tomonari Kawakami, Kyoto (JP)

(73) Assignee: OMRON Corporation, Kyoto (JP)

( * ) Notice: Subject to any disclaimer, the term of this patent is extended or adjusted under 35 U.S.C. 154(b) by 170 days.

(21) Appl. No.: 17/432,939

(22) PCT Filed: Mar. 10, 2020

(86) PCT No.: PCT/JP2020/010291
§ 371 (c)(1),
(2) Date: Aug. 23, 2021

(87) PCT Pub. No.: WO2020/189412
PCT Pub. Date: Sep. 24, 2020

(65) Prior Publication Data
US 2022/0172907 A1 Jun. 2, 2022

(30) Foreign Application Priority Data

Mar. 15, 2019 (JP) .................................. 2019-048012

(51) Int. Cl.
*H01H 9/04* (2006.01)
*G01S 7/481* (2006.01)
*H01H 13/06* (2006.01)

(52) U.S. Cl.
CPC .............. *H01H 9/04* (2013.01); *G01S 7/4813* (2013.01); *H01H 13/06* (2013.01); *H01H 2009/048* (2013.01)

(58) Field of Classification Search
CPC ........ G01S 7/4813; H01H 9/04; H01H 13/06; H01H 2009/048; H01H 11/00;
(Continued)

(56) References Cited

U.S. PATENT DOCUMENTS 7,366,409 B2 * 4/2008 Kurosawa .............. H04N 23/66
396/543
2016/0098016 A1 4/2016 Ely et al.

FOREIGN PATENT DOCUMENTS

EP 3467859 4/2019
JP H112327 1/1999
(Continued)

OTHER PUBLICATIONS

"International Search Report (Form PCT/ISA/210) of PCT/JP2020/010291", dated Jun. 9, 2020, with English translation thereof, pp. 1-4.
"Written Opinion of the International Searching Authority (Form PCT/ISA/237) of PCT/JP2020/010291", dated Jun. 9, 2020, with English translation thereof, pp. 1-6.
(Continued)

*Primary Examiner* — Anthony R Jimenez
(74) *Attorney, Agent, or Firm* — JCIPRNET (57) ABSTRACT

A sensor and an electronic device are provided. The sensor includes a setting part and a seal ring in an annular shape. The setting part changes a setting of a sensor main body. The seal ring is provided to surround a shaft of the setting part and seals a gap between the shaft and a housing. The seal ring has a curved surface part and a pair of end parts. The curved surface part is curved convexly in a cross-sectional view. The pair of end parts have a shape different from the curved surface part and extend in an axial direction of the seal ring, on two sides of the curved surface part in the axial direction of the seal ring.

8 Claims, 11 Drawing Sheets

(58) Field of Classification Search
CPC ......... H01H 2231/00; H01H 2231/002; H01H
2231/016; H01H 2231/022; H01H
2239/034; H01H 2227/036; H01H
2215/012; H01H 2223/03; H01H 13/70;
H01H 2221/026; H01H 3/02; H01H 3/00;
H01H 3/12; H01H 9/00; H01H 9/02;
H01H 9/041; H01H 13/00; H01H 13/04;
H01H 13/26; H01H 13/50; H01H
2003/02; H01H 2003/12; H01H 2223/00;
H01H 2223/002; H01H 2223/01; H01H
2223/04; H01H 2223/044
USPC ..................................................... 200/302.1
See application file for complete search history.

(56) References Cited

FOREIGN PATENT DOCUMENTS

| JP | 2007073417 | 3/2007 |
| JP | 2008298614 | 12/2008 |
| JP | 2015115290 | 6/2015 |
| JP | 6838710 | 3/2021 |

OTHER PUBLICATIONS

"Search Report of Europe Counterpart Application", dated Nov. 8, 2022, p. 1-p. 8.
"Office Action of Korea Counterpart Application", dated Mar. 28, 2023, with English translation thereof, pp. 1-8.

* cited by examiner

SENSOR AND ELECTRONIC DEVICE

CROSS-REFERENCE TO RELATED APPLICATION

This application is a 371 application of the International PCT application serial no. PCT/JP2020/010291, filed on Mar. 10, 2020, which claims the priority benefits of Japan Patent Application No. 2019-048012, filed on Mar. 15, 2019. The entirety of each of the above-mentioned patent applications is hereby incorporated by reference herein and made a part of this specification.

BACKGROUND

Technical Field

The disclosure relates to a sensor.

Description of Related Art

Electronic devices such as sensors may be used in an environment where liquids such as chemicals are used. For example, as the photoelectric sensor disclosed in Patent Document 1 is mainly attached to a production line or equipment of a factory, it is used in an environment where the sensor main body is exposed to cleaning agents, running water, etc. in a cleaning process or the like.

In the electronic device used in such an environment, water resistance is required to prevent the infiltration of liquids to the inside, and the structure is required to have high sealing properties.

Figure 9:
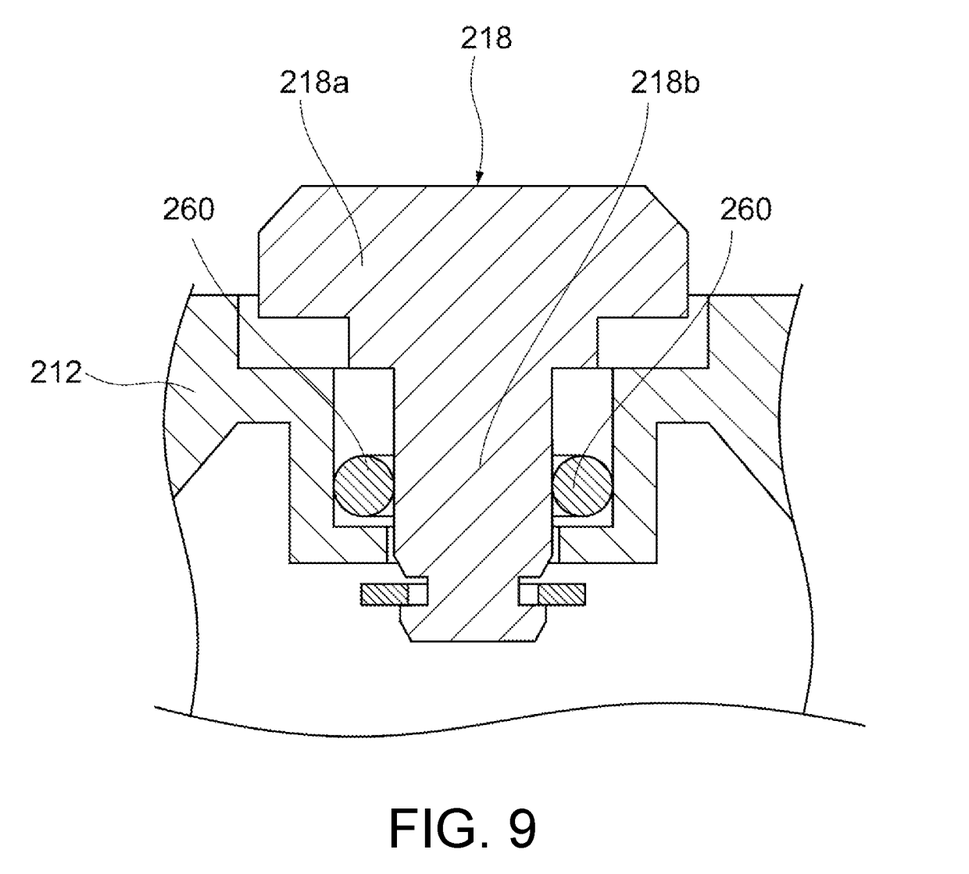
FIG. 9 is a view showing the configuration of a conventional O-ring.

For example, in a photoelectric sensor, a sealing structure of a switch is adopted to prevent liquids from entering the inside. In the example shown in FIG. 9, a switch 218 for switching the setting (e.g., an operation mode or the like) of a photoelectric sensor is provided in a housing 212. The switch 218 shown in the figure is composed of a push button-type switch, and with a user operating a top portion 218a on its tip side, adjustments such as switching the setting of the photoelectric sensor to, for example, a two-step operation mode may be performed. Around the switch 218, a sealant 260 in an annular shape (e.g., as shown in FIG. 9, an O-ring having a substantially circular cross-sectional shape) is arranged to fill a gap between the housing 212 and a shaft 218b of the switch 218, and accordingly, the space in which electronic components inside the housing 212 are housed is sealed from the external space.

RELATED ART

Patent Document(s)

[Patent Document 1] Japanese Patent Application Laid-Open No. 2007-073417

SUMMARY

Problems to be Solved

Figure 10:
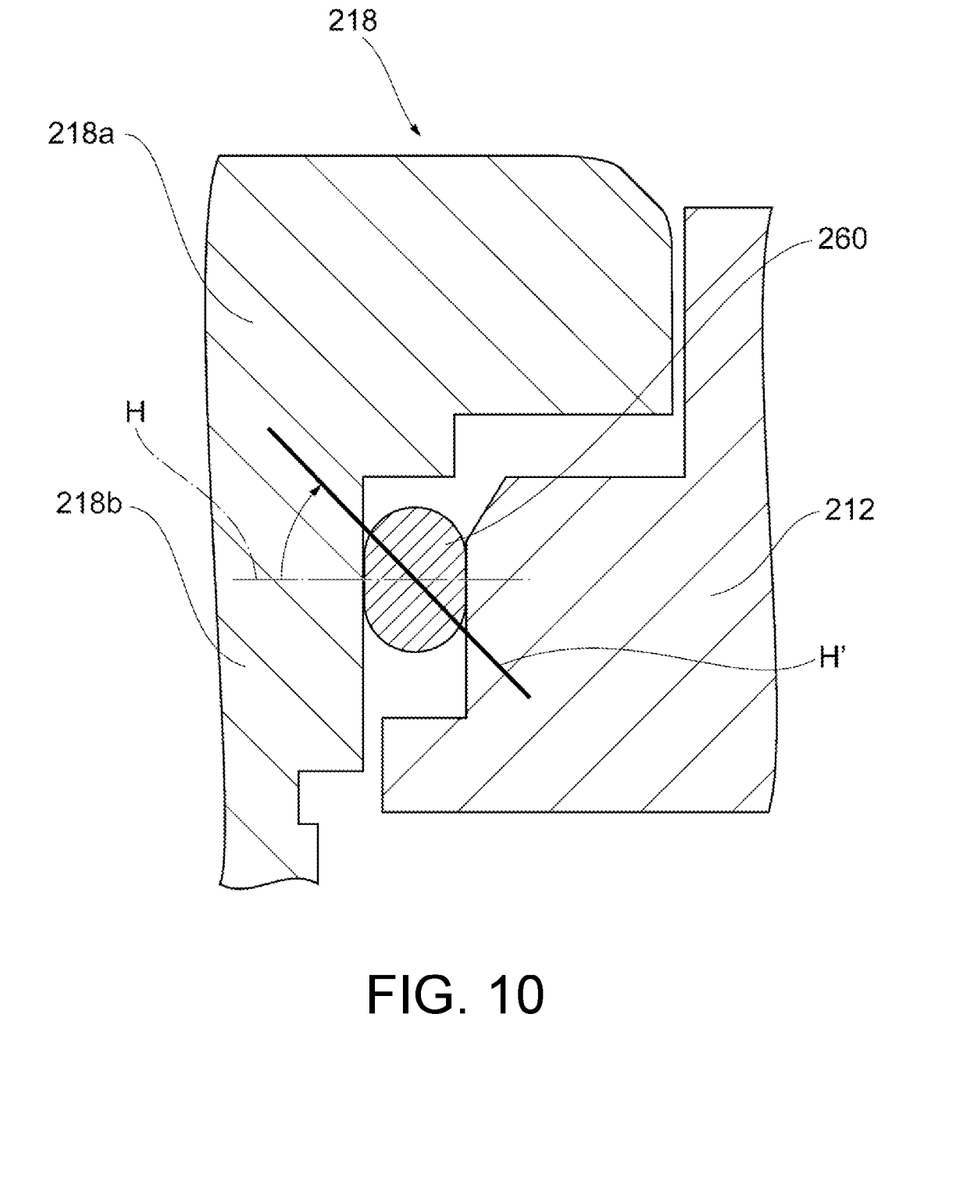
FIG. 10 is a view showing the configuration of a conventional O-ring.

As described above, a sealing structure in which the sealant 260 in an annular shape is provided between the housing 212 and the switch 218 is known; however, for example, as shown in FIG. 10, when the user operates the switch 218, excessive rotation (for example, a twist in which an axis H shown in FIG. 10 (i.e., an axis that passes through a center of the sealant 260 in an axial direction (up-down direction in FIG. 10) and is orthogonal to the axial direction in a cross-sectional view) rotates to an axis H') of the sealant 260 in contact with the shaft 218b of the switch 218 may occur due to friction. In such a case, the sealing property may be reduced, and it may not be possible to sufficiently prevent liquids from entering the inside of the electronic device.

Therefore, an objective of the disclosure is to provide a sensor capable of suppressing a decrease in the sealing performance of a sealant.

Means for Solving the Problems

According to an embodiment of the disclosure, a sensor, which houses in a housing at least one of a light projecting part that emits light and a light receiving part that receives light, includes a setting part and a seal ring in an annular shape. The setting part changes a setting of a sensor main body in response to an input operation from outside and has a shaft inserted into the housing. The seal ring is provided to surround the shaft and seals a gap between the shaft and the housing. The seal ring has a curved surface part and a pair of end parts. The curved surface part is curved convexly in a cross-sectional view. The pair of end parts have a shape different from the curved surface part and extend along an axial direction of the seal ring, on two sides of the curved surface part in the axial direction of the seal ring.

According to this embodiment, since a pair of end parts are provided in the seal ring, and the pair of end parts have a shape different from the curved surface part and extend along the axial direction of the seal ring, at least one of the pair of end parts can be brought into contact with the housing or the shaft of the setting part when the setting part is operated and the seal ring is rotated due to friction. By contacting in this manner, when the setting part is operated, excessive rotation of the seal ring in contact with the shaft of the setting part is suppressed. As a result, it is possible to suppress a decrease in the sealing performance of the seal ring.

In the above embodiment, when the shaft of the setting part moves in an axial direction in response to the input operation from outside, one of the pair of end parts may be brought into contact with an outer circumferential surface of the shaft, and the other of the pair of end parts may be brought into contact with a part of the housing.

According to this embodiment, since one of the pair of end parts is brought into contact with the outer circumferential surface of the shaft, and the other of the pair of end parts is brought into contact with a part of the housing, when the setting part is operated by the user, for example, it is possible to suppress excessive rotation of the seal ring in contact with the outer circumferential surface of the shaft of the setting part.

In the above embodiment, an inner circumferential surface of the pair of end parts may be located more radially outward than an inner circumferential surface of the curved surface part in a cross-sectional view, and an outer circumferential surface of the pair of end parts may be located more radially inward than an outer circumferential surface of the curved surface part in a cross-sectional view.

According to this embodiment, since the pair of end parts of the seal ring arranged between the shaft and the housing are provided at positions at which they are not in contact with either the shaft or the housing when the setting part is not operated, it is possible to suppress the occurrence of excessive rotation of the seal ring without interfering with the operability of the setting part.

In the above embodiment, one of the pair of end parts may have a planar cross-sectional shape extending along a first direction from one axial end side of the curved surface part, and the other of the pair of end parts may have a planar cross-sectional shape extending along a direction opposite to the first direction from another axial end side of the curved surface part.

According to this embodiment, since the pair of end parts have planar shapes extending in directions opposite to each other from the one axial end side or the another axial end side of the curved surface part, for example, when the user operates the setting part, at least one of the pair of end parts can be easily brought into contact with the shaft of the setting part or a part of the housing.

In the above embodiment, the curved surface part and the pair of end parts may each be formed of a same elastic material.

According to this embodiment, since the curved surface part and the pair of end parts constituting the seal ring are formed of the same elastic material, compared with the configuration in which the curved surface part and the pair of end parts are formed of different materials, the cost can be reduced.

According to an embodiment of the disclosure, an electronic device, which includes a housing and a substrate housed in the housing and mounted with a control circuit, includes a setting part and a seal ring in an annular shape. The setting part changes a setting of an electronic device main body in response to an input operation from outside and has a shaft inserted into the housing. The seal ring is provided to surround the shaft and seals a gap between the shaft and the housing. The seal ring has a curved surface part and a pair of end parts. The curved surface part is curved convexly in a cross-sectional view. The pair of end parts have a shape different from the curved surface part and extend along an axial direction of the seal ring, on two sides of the curved surface part in the axial direction of the seal ring.

According to this embodiment, since the pair of end parts have a shape different from the curved surface part and extend along the axial direction of the seal ring, when the setting part is operated and the seal ring is rotated due to the friction between the shaft of the setting part and the seal ring, at least one of the pair of end parts can be brought into contact with the housing or the shaft of the setting part. Accordingly, when the setting part is operated, excessive rotation of the seal ring in contact with the shaft of the setting part is suppressed. As a result, it is possible to suppress a decrease in the sealing performance of the seal ring.

Effects

According to the disclosure, it is possible to provide a sensor and an electronic device capable of suppressing a decrease in the sealing performance of a sealant.

DESCRIPTION OF THE EMBODIMENTS

Embodiments of the disclosure will be described with reference to the accompanying drawings. For convenience of illustration, the front/back/left/right and top/bottom orientations are based on those shown in FIG. 1 and FIG. 2. In the drawings, parts labeled with the same reference numerals have the same or similar configurations.

In the following, an example of a photoelectric sensor 10 will be described as an example of an electronic device, but the disclosure is not limited to the photoelectric sensor 10 and may be applied to other electronic devices including sensors other than the photoelectric sensor 10.

Figure 1:
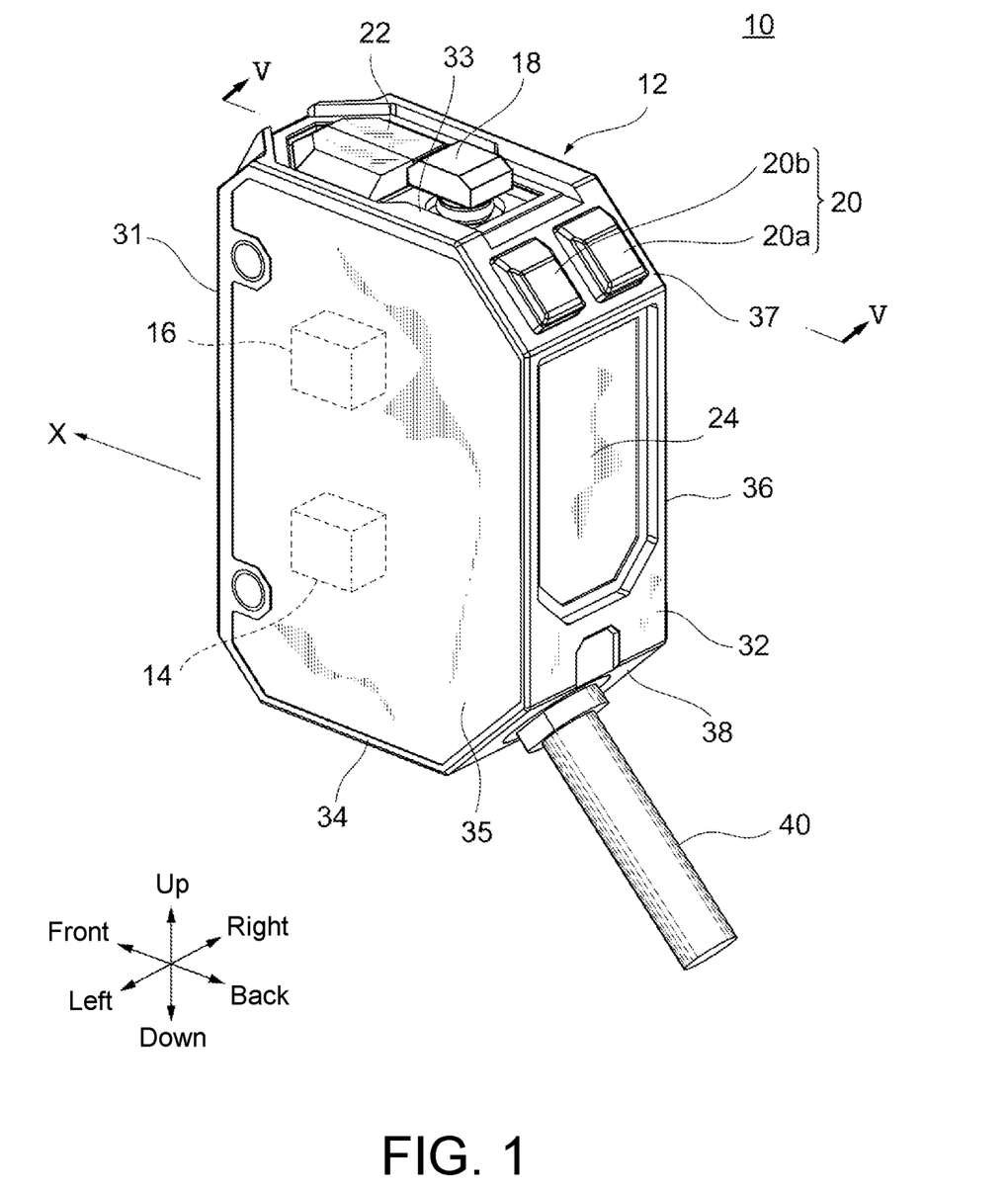
FIG. 1 is a perspective view of a photoelectric sensor according to an embodiment as viewed from one direction.
Figure 2:
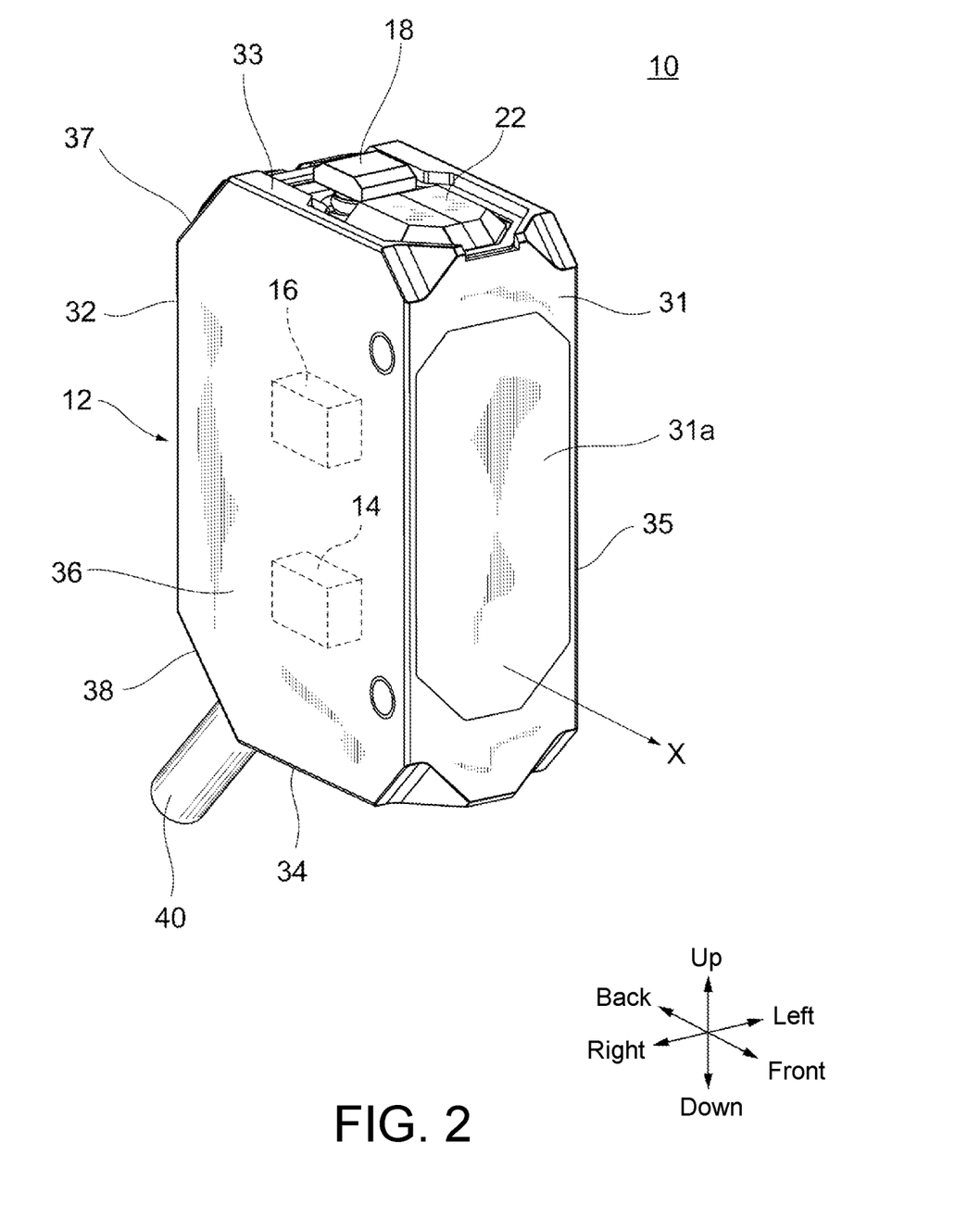
FIG. 2 is a perspective view of the photoelectric sensor of FIG. 1 as viewed from another direction.
Figure 3:
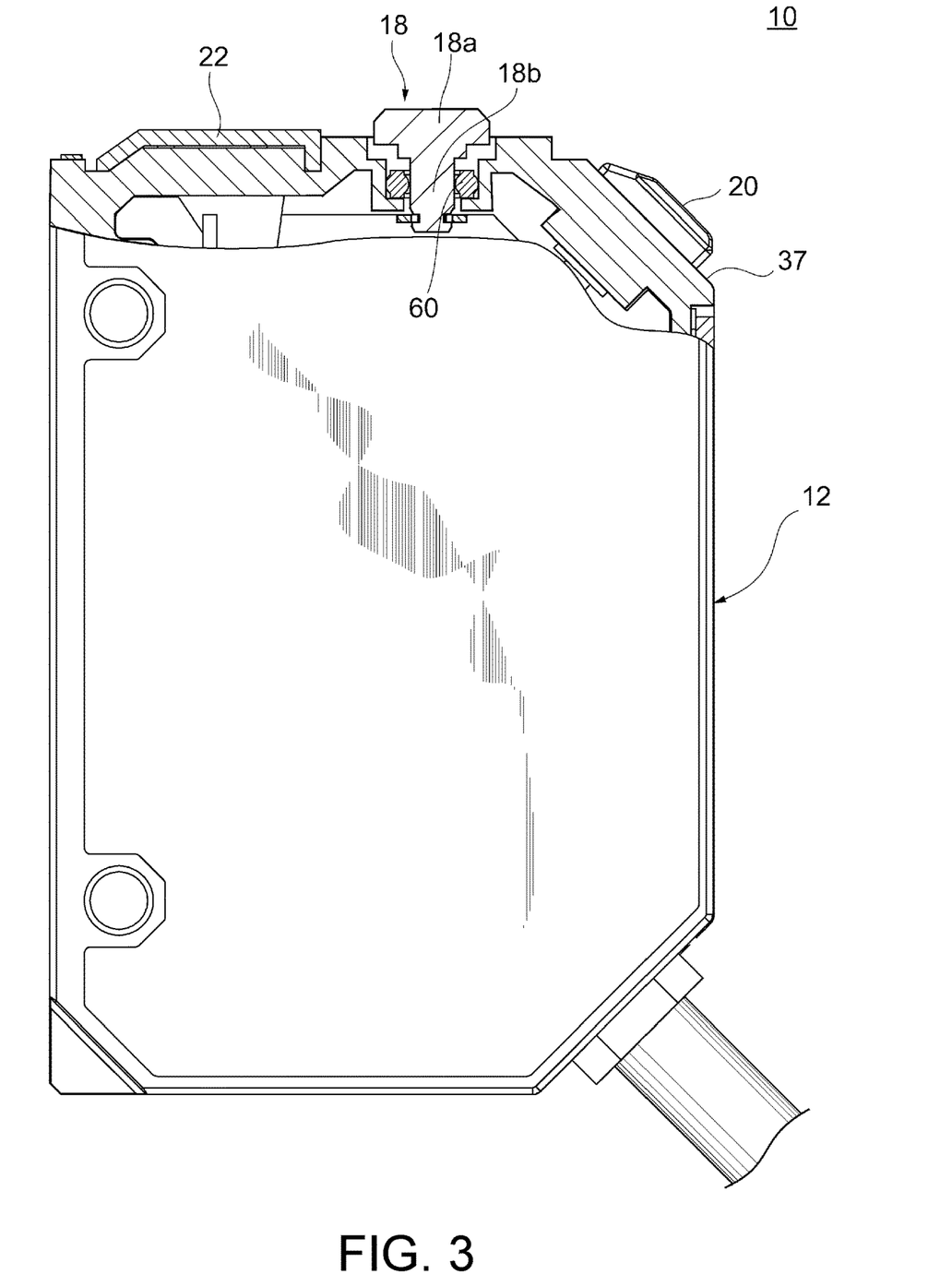
FIG. 3 is a cross-sectional view taken along line V-V of FIG. 1.

As shown in FIG. 1 and FIG. 2, a photoelectric sensor 10 includes a housing 12. FIG. 3 is a cross-sectional view taken along line V-V of FIG. 1. A light projecting part 14 and a light receiving part 16 are housed in the housing 12. Further, for example, a teach button 18, an adjustment button 20, an indicator 22, and a display part 24 are provided on the outer surface of the housing 12. In the following, an example in which the housing 12 houses the light projecting part 14 and the light receiving part 16 will be described as a premise, but the disclosure is not limited to the illustrated example; in this embodiment, at least one of the light projecting part 14 and the light receiving part 16 may be housed in the housing 12. That is, the sensor of this embodiment also includes the form in which the light projecting part 14 and the light receiving part 16 are respectively housed in separate housings.

The light projecting part 14 projects light to an object being detected and has a light emitting element and a light projecting lens. The light emitting element is, for example, a laser diode, with an optical axis X parallel to a front-back direction. The light receiving part 16 receives reflected light of the light projected to the object being detected and has a light receiving element and a light receiving lens. The light receiving element is, for example, a bi-cell photodiode or a position detecting element. The principle of Time of Flight (TOF) or triangulation may be used, for example, as the detection principle of distance measurement for determining the distance to the object being detected. For example, when the principle of triangulation is used in the above configuration, the light emitted from the light emitting element is projected onto the object being detected through the light projecting lens, and the light reflected by the object being detected forms an image on the light receiving element through the light receiving lens. The light receiving element outputs two light receiving signals corresponding to the position of the formed image and transmits the signals to the control circuit via an amplifier. The amplifier and the control circuit are built in the photoelectric sensor 10, and in the control circuit, a position signal value calculated from the two light receiving signals as received is compared with a threshold value to determine the distance to the object being detected.

The teach button 18 functions as a setting part for changing a setting of a sensor main body, and has, for example, a function of setting a threshold value in response to an input operation from outside. Here, the threshold value refers to a reference value in the photoelectric sensor 10 for determining detection/non-detection of an object being detected or determining a distance to the object being detected, and is one of the sensitivity parameters for adjusting sensitivity. In addition to the threshold value, the sensitivity parameters may include also a power of light emitted from the light projecting part 14 (i.e., a light projection intensity), an amplification factor of the amount of light received by the light receiving part 16 (i.e., a gain), and the like. For example, in the case of a transparent object being detected having a low reflectance, a high light projection intensity is set. When the user presses the teach button 18, a teaching process of setting the sensitivity parameters, including at least the threshold value, is performed, and the sensitivity parameters, including at least the threshold value, are automatically set to a certain value. The teaching process includes, for example, a one-point teaching process and a two-point teaching process. Since its contents have been detailed in prior patent documents of the applicant (e.g., Japanese Patent Application Laid-Open No. 2008-298614), the description thereof is omitted herein.

The adjustment button 20 functions as an adjustment part for finely adjusting the threshold value set by the teach button 18 in response to an input operation from outside. The adjustment button 20 has, for example, push-type UP button 20a and DOWN button 20b. The UP button 20a and the DOWN button 20b are arranged side by side in the left-right direction. When the user presses the UP button 20a, the threshold value set by the teach button 18 changes one by one in an increasing direction, and when the user presses the DOWN button 20b, the threshold value changes one by one in a decreasing direction. Following the input operation from outside, the threshold value set by the teach button 18 is raised or lowered, and the threshold value to be used in the photoelectric sensor 10 is updated. Using the adjustment button 20, it is also possible to finely adjust other adjustable values apart from the threshold value. For example, it is possible to finely adjust the brightness of the display part 24.

The indicator 22 lights up according to a power supply status and a detection status of the photoelectric sensor 10. For example, the indicator 22 has a power light that lights up when the power is on, and an operation indicator light that lights up when an object being detected is detected. The power light and the operation indicator light are each composed of, for example, an LED, and are lit with different display colors. The display part 24 displays various types of information. For example, the display part 24 displays the threshold value set by the teach button 18, the threshold value when being finely adjusted by the adjustment button 20, the distance value to the object being detected determined by the photoelectric sensor 10, etc.

The housing 12 is formed of, for example, resin or metal, and has a substantially rectangular parallelepiped shape. The housing 12 has a front surface 31, a back surface 32, a top surface 33, a bottom surface 34, a side surface 35, and a side surface 36 with respect to the six surfaces constituting the rectangular parallelepiped. The front surface 31 and the back surface 32 are opposite to each other with the interior of the housing 12 interposed therebetween. Similarly, the top surface 33 and the bottom surface 34 are opposite to each other with the interior of the housing 12 interposed therebetween, and the side surface 35 and the side surface 36 are opposite to each other with the interior of the housing 12 interposed therebetween. The front surface 31 and the back surface 32 are formed to be longer in the up-down direction than in the left-right direction. Similarly, the top surface 33 and the bottom surface 34 are formed to be longer in the front-back direction than in the left-right direction, and the side surfaces 35 and 36 are formed to be longer in the up-down direction than in the front-back direction. The front surface 31 has a light projecting/receiving surface 31a that allows light from the light projecting part 14 and light to the light receiving part 16 to pass through. The display part 24 is provided on the back surface 32 located on the opposite side of the front surface 31. The top surface 33 is adjacent to the front surface 31 and extends in a direction orthogonal to the front surface 31 and the back surface 32. The indicator 22 and the teach button 18 are provided on the top surface 33 sequentially from the front surface 31 side.

In addition to the above six surfaces, the housing 12 has an inclined surface 37 and an inclined surface 38 at positions corresponding to two corners of the rectangular parallelepiped. The adjustment button 20 is provided on the inclined surface 37. Specifically, the UP button 20a and the DOWN button 20b of the adjustment button 20 are arranged on the inclined surface 37 with a predetermined gap present in the left-right direction. A cable 40 is provided on the inclined surface 38. The cable 40 is used, for example, to transmit a detection signal indicating a detection result of the photoelectric sensor 10 to outside of the photoelectric sensor 10. The inclined surface 37 is inclined with respect to the back surface 32 and the top surface 33 and connects the back surface 32 and the top surface 33. Similarly, the inclined surface 38 is inclined with respect to the back surface 32 and the bottom surface 34 and connects the two surfaces.

A configuration (e.g., a substrate mounted with a light projecting element, a light receiving element, a light projecting circuit (not shown) driving the light projecting element, and a light receiving circuit (not shown) electrically processing a light receiving signal of the light receiving element, etc.) that is generally provided as a photoelectric sensor is housed in the housing 12. The cable 40 has a cable core wire (not shown) provided therein, and the cable core wire passes through the interior of the housing 12 and is connected to the substrate arranged in the housing 12. The above "substantially rectangular parallelepiped shape" associated with the housing 12 does not mean a rectangular parallelepiped of which the internal angles are all 90 degrees, but at least refers to a rectangular parallelepiped having one corner chamfered like the inclined surface 37.

Figure 4:
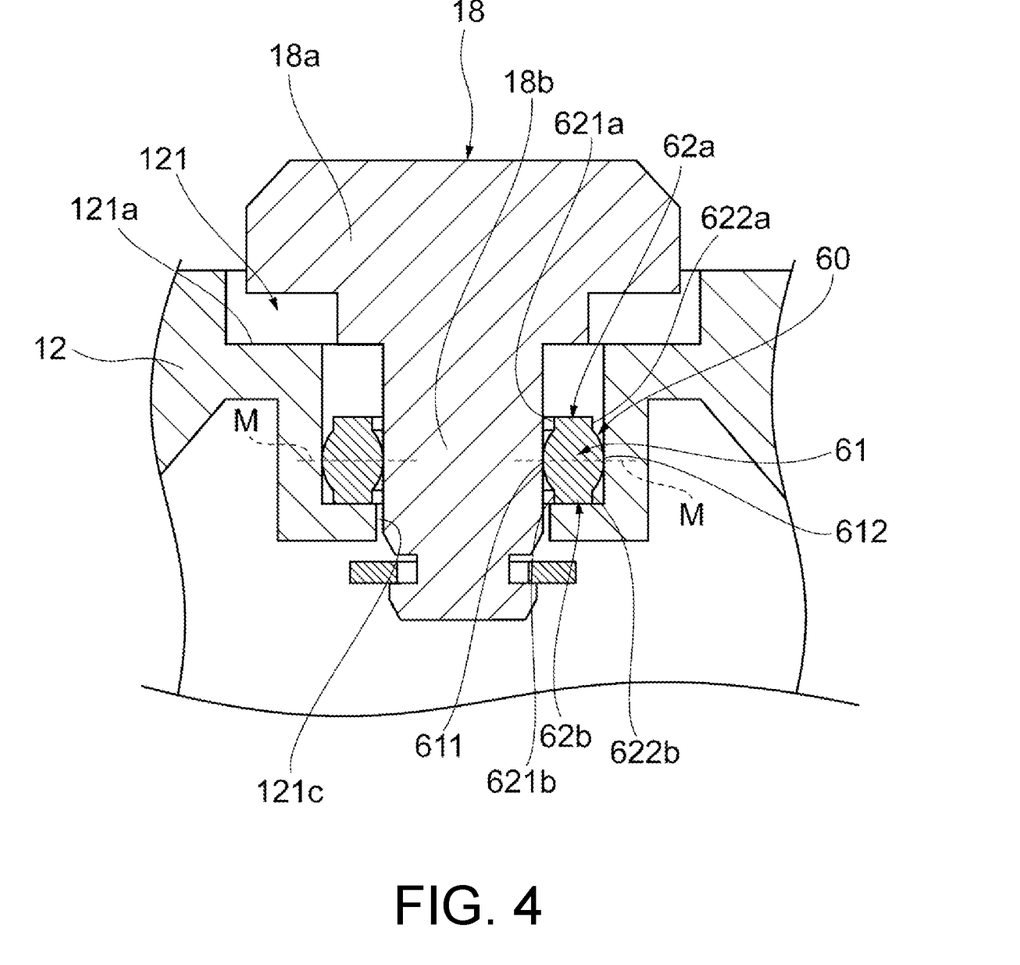
FIG. 4 is an enlarged cross-sectional view showing a configuration around a setting part of the sensor.

The configuration around the teach button 18 will be described. FIG. 4 is an enlarged cross-sectional view showing a configuration around the teach button 18. In this specification, although the configuration around the teach button 18 will be described, the same configuration as described below may be applied to other setting parts (e.g., other setting parts including the adjustment button 20) for adjusting the setting of the photoelectric sensor 10.

The housing 12 is formed with a groove 121 for accommodating the lower portion of the teach button 18. The groove 121 is recessed from its periphery and accommodates the lower portion of the teach button 18 to expose a top portion 18a of the teach button 18 to the outside. The groove 121 is formed to correspond to the outer shape of the teach button 18, and an inner wall 121a of the groove 121 is configured to be able to guide the up-down movement of the teach button 18. Further, a through hole 121c through which a shaft 18*b* of the teach button 18 is inserted is formed at the bottom of the groove 121, and an O-ring 60 (seal ring) in an annular shape is provided between the housing 12 and the shaft 18*b* of the teach button 18.

Figure 5:
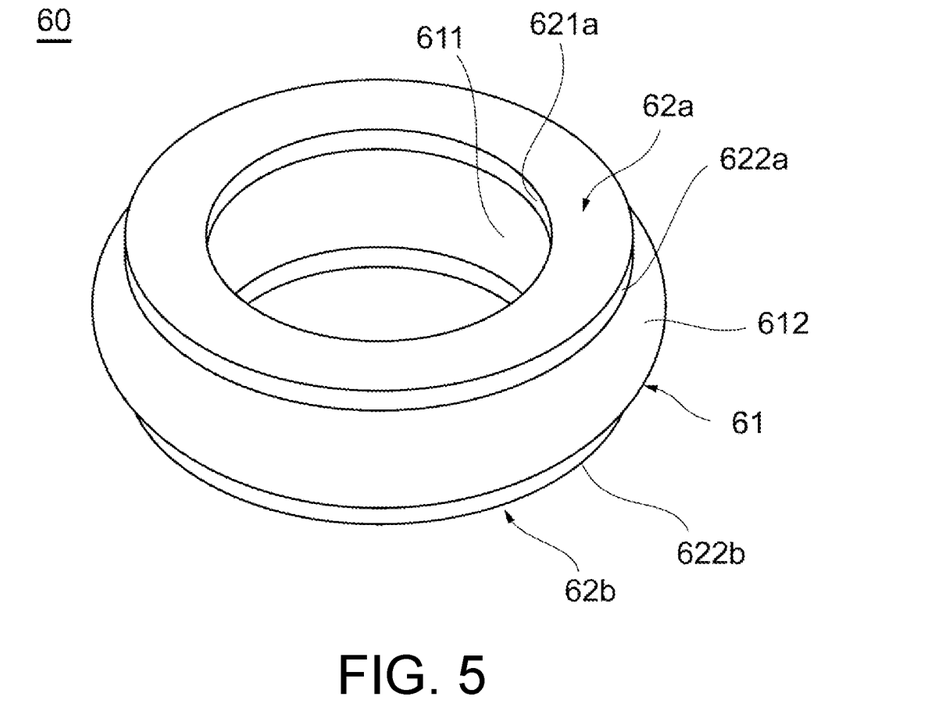
FIG. 5 is a perspective view showing the configuration of an O-ring.
Figure 6:
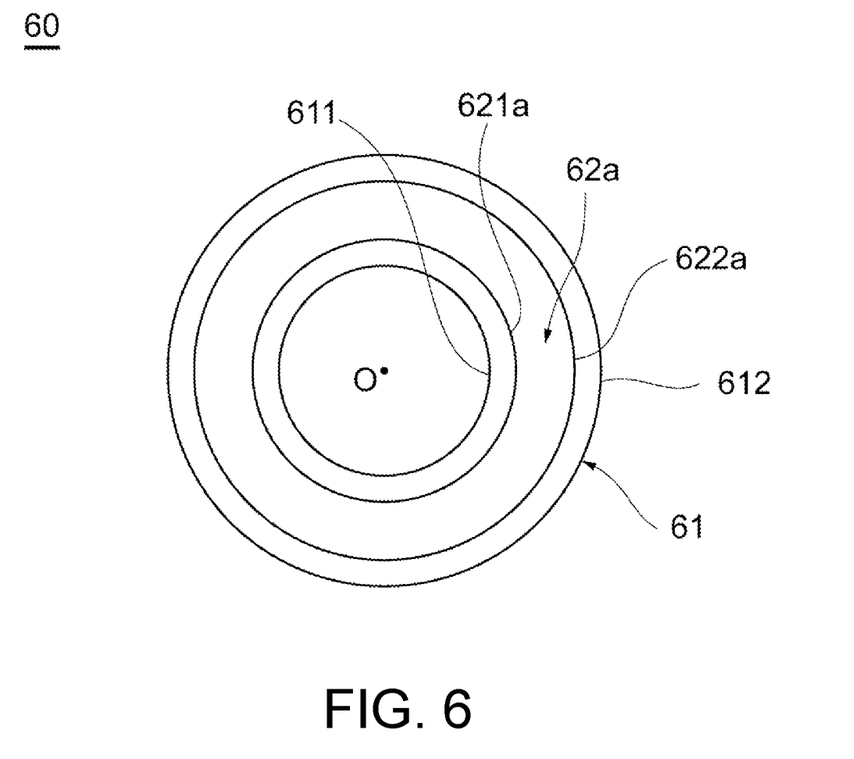
FIG. 6 is a plan view showing the configuration of the O-ring.
Figure 7:
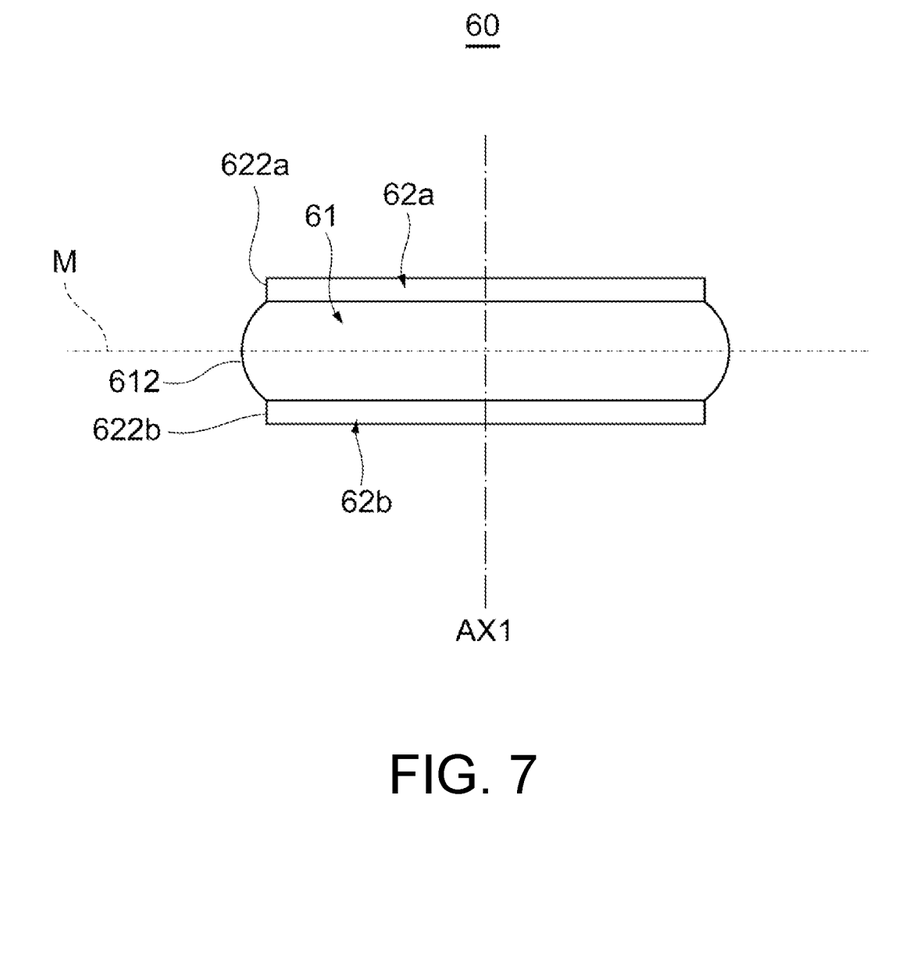
FIG. 7 is a side view showing the configuration of the O-ring.

The O-ring 60 shown in FIG. 4 is provided on the housing 12 to surround the shaft 18*b*, and seals between the shaft 18*b* and the housing 12. The configuration of the O-ring 60 in this embodiment is shown in FIG. 5 to FIG. 7. FIG. 5 is a perspective view showing the configuration of the O-ring 60. FIG. 6 is a plan view showing the configuration of the O-ring 60. FIG. 7 is a side view showing the configuration of the O-ring 60.

As shown in FIG. 4 to FIG. 7, the O-ring 60 in an annular shape has a curved surface part 61 having a convexly curved shape in a cross-sectional view, and a pair of planar surface parts 62*a* and 62*b* (a pair of end parts) connected to the curved surface part 61.

When a plane that is orthogonal to an axis AX1 of the O-ring 60 and passes through a center O of the O-ring 60 is defined as an intermediate plane M (see FIG. 7), the curved surface part 61 is formed symmetrically with respect to the intermediate plane M.

In a cross-sectional view, an outer circumferential surface 612 of the curved surface part 61 has an arc shape that curves radially outward as it gradually approaches the intermediate plane M (see FIG. 7) from one end (the upper end of the curved surface part 61 in FIG. 4) of the curved surface part 61, and has an arc shape that curves radially outward as it gradually approaches the intermediate plane M from another end (the lower end of the curved surface part 61 in FIG. 4) of the curved surface part 61.

In a cross-sectional view, an inner circumferential surface 611 of the curved surface part 61 has an arc shape that curves radially inward as it gradually approaches the intermediate plane M from the one end (the upper end of the curved surface part 61 in FIG. 4) of the curved surface part 61, and has an arc shape that curves radially inward as it gradually approaches the intermediate plane M from the another end (the lower end of the curved surface part 61 in FIG. 4) of the curved surface part 61.

The pair of planar surface parts 62*a* and 62*b* are connected respectively to one axial end side (the upper end side of the curved surface part 61 in FIG. 7) and another axial end side (the lower end side of the curved surface part 61 in FIG. 7) of the curved surface part 61. In this embodiment, the curved surface part 61 and the pair of planar surface parts 62*a* and 62*b* are made of the same elastic material. Hereinafter, of the pair of planar surface parts 62*a* and 62*b*, the portion located on the upper side in FIG. 7 is referred to as an upper side planar surface part 62*a*, and of the pair of planar surface parts 62*a* and 62*b*, the portion located on the lower side in FIG. 7 is referred to as a lower side planar surface part 62*b*. Further, the pair of planar surface parts 62*a* and 62*b* are also collectively referred to as planar surface parts 62 in this specification.

The upper side planar surface part 62*a* is connected to the one axial end side (the upper side of the curved surface part 61 in FIG. 4) of the curved surface part 61. The upper side planar surface part 62*a* extends from the one axial end side of the curved surface part 61 to the upper side (in the upward direction (first direction) in FIG. 4). An inner circumferential surface 621*a* and an outer circumferential surface 622*a* of the upper side planar surface part 62*a* have a planar cross-sectional shape. As shown in FIG. 4, the inner circumferential surface 621*a* of the upper side planar surface part 62*a* is located more radially outward than the inner circumferential surface 611 of the curved surface part 61 in a cross-sectional view. The outer circumferential surface 622*a* of the upper side planar surface part 62*a* is located more radially inward than the outer circumferential surface 612 of the curved surface part 61 in a cross-sectional view.

The lower side planar surface part 62*b* is connected to the another axial end side (the lower side of the curved surface part 61 in FIG. 4) of the curved surface part 61. The lower side planar surface part 62*b* extends from the another axial end side of the curved surface part 61 to the lower side (in the downward direction (a direction opposite to the first direction) in FIG. 4). An inner circumferential surface 621*b* and an outer circumferential surface 622*b* of the lower side planar surface part 62*b* have a planar cross-sectional shape. As shown in FIG. 4, the inner circumferential surface 621*b* of the lower side planar surface part 62*b* is located more radially outward than the inner circumferential surface 611 of the curved surface part 61 in a cross-sectional view. The outer circumferential surface 622*b* of the lower side planar surface part 62*b* is located more radially inward than the outer circumferential surface 612 of the curved surface part 61 in a cross-sectional view.

As an example, the pair of planar surface parts 62*a* and 62*b* have been shown to extend parallel to the axis AX1 direction of the O-ring 60 in FIG. 7, but they are not limited to this example. That is, in this specification, the description "the pair of planar surface parts 62*a* and 62*b* extend along the axis AX1 direction of the O-ring 60" covers not only the embodiment of extending parallel to the axis AX1 direction but also the embodiment of extending at a predetermined angle with respect to the axis AX1 direction.

Further, in the illustrated example, the pair of planar surface parts 62*a* and 62*b* have a planar shape in a cross-sectional view; however, as described below, if at least one of the pair of planar surface parts 62*a* and 62*b* has a function of contacting the shaft of the setting part or a part of the housing when the setting part is operated, it is also possible to change their shape to a shape other than the planar shape.

Figure 8A:
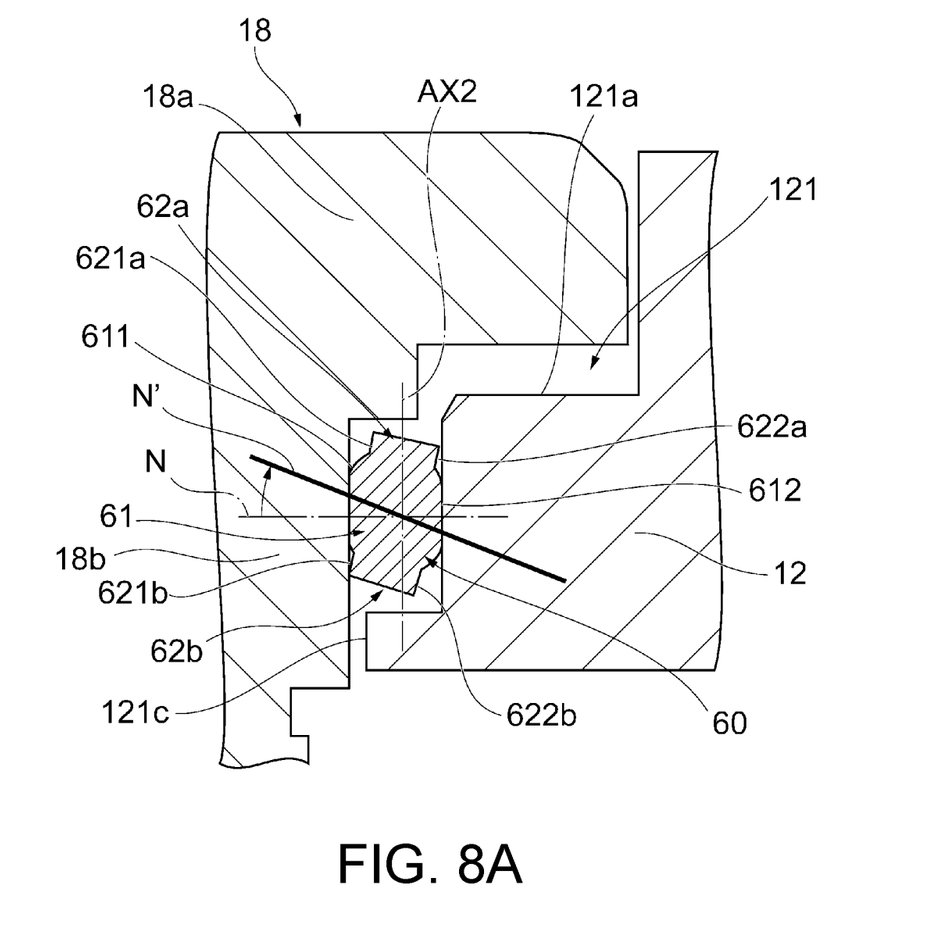
FIG. 8A is a view showing a state of the O-ring when the setting part is operated.
Figure 8B:
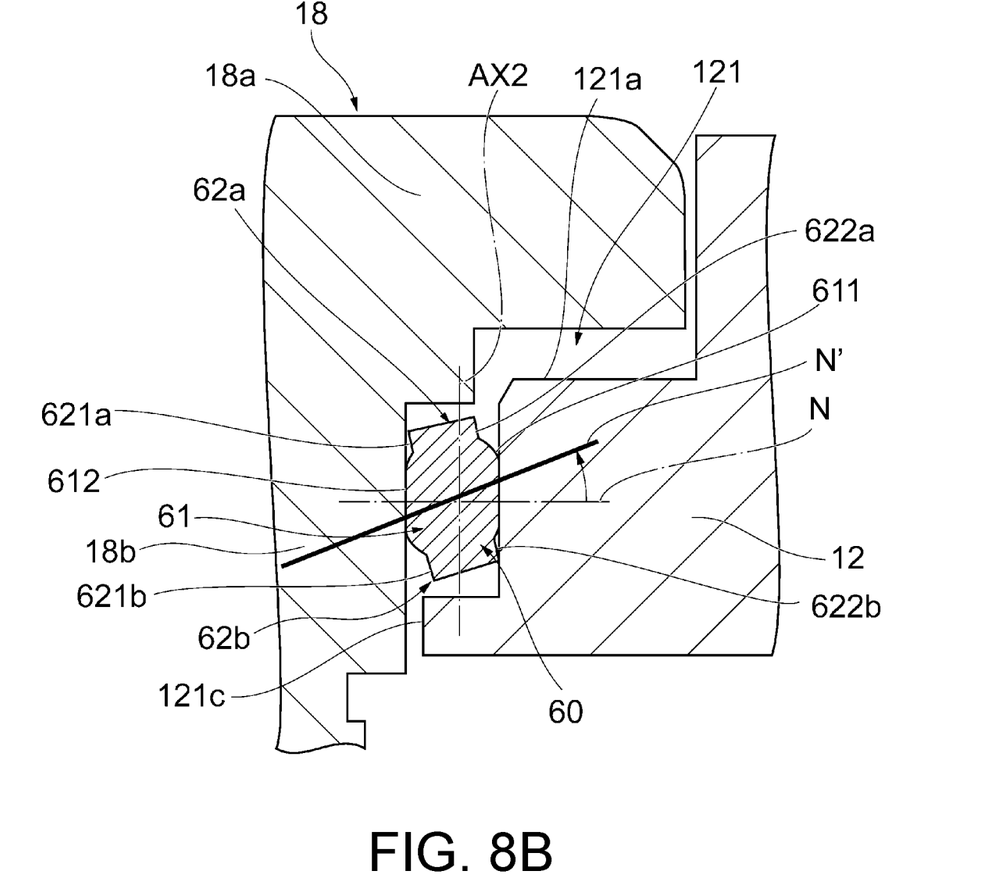
FIG. 8B is a view showing a state of the O-ring when the setting part is operated.

Using the photoelectric sensor 10 having the above configuration, the state of the O-ring 60 when the teach button 18 (setting part) is operated in response to an input operation from outside will be described below. FIG. 8A and FIG. 8B are views showing the state of the O-ring 60 when the teach button 18 is operated. FIG. 8A shows an example of the O-ring 60 when the shaft 18*b* of the teach button 18 moves upward, and FIG. 8B shows an example of the O-ring 60 when the shaft 18*b* of the teach button 18 moves downward.

In this embodiment, when the shaft 18*b* of the teach button 18 moves in the axial direction in response to an input operation from outside, one of the planar surface parts 62 of the O-ring 60 is brought into contact with the outer circumferential surface of the shaft 18*b*, and the other of the planar surface parts 62 is brought into contact with a part of the housing 12. Specifically, as shown in FIG. 8A, when the shaft 18*b* of the teach button 18 moves upward, and the O-ring 60 in contact with the outer circumferential surface of the shaft 18*b* rotates due to friction (i.e., in a vertical cross-sectional view, with an axis AX2 defined to be parallel to the axis AX1 (see FIG. 7) and pass through the center of the curved surface part 61 and the planar surface part 62 in the left-right direction, when the O-ring 60 is twisted so that an axis N orthogonal to the axis AX2 rotates to an axis N'), the upper end of the outer circumferential surface 622*a* of the upper side planar surface part 62*a* is brought into contact with a part of the housing 12, and the lower end of the inner circumferential surface 621*b* of the lower side planar surface part 62*b* is brought into contact with the outer circumferential surface of the shaft 18*b* of the teach button 18. On the other hand, as shown in FIG. 8B, when the shaft 18b of the teach button 18 moves downward, and the O-ring 60 in contact with the outer circumferential surface of the shaft 18b rotates due to friction (i.e., in a vertical cross-sectional view, with an axis AX2 defined to be parallel to the axis AX1 (see FIG. 7) and pass through the center of the curved surface part 61 and the planar surface part 62 in the left-right direction, when the O-ring 60 is twisted so that an axis N orthogonal to the axis AX2 rotates to an axis N'), the upper end of the inner circumferential surface 621a of the upper side planar surface part 62a is brought into contact with the outer circumferential surface of the shaft 18b of the teach button 18, and the lower end of the outer circumferential surface 622b of the lower side planar surface part 62b is brought into contact with a part of the housing 12. As described above, in this embodiment, when the shaft 18b of the teach button 18 moves in the axial direction in response to an input operation from outside, one of the pair of planar surface parts 62a and 62b is brought into contact with the outer circumferential surface of the shaft 18b, and the other of the pair of planar surface parts 62a and 62b is brought into contact with a part of the housing 12. Accordingly, it is possible to suppress excessive rotation of the O-ring 60 arranged between the housing 12 and the shaft 18b due to friction.

As described above, in this embodiment, the O-ring 60 has the curved surface part 61 and the planar surface part 62. The curved surface part 61 is curved convexly in a radial direction in a cross-sectional view. The planar surface part 62 is connected respectively to one axial end side and another axial end side of the curved surface part 61 and has a shape different from the curved surface part 61. The planar surface part 62 extends in a direction along the axis AX1 of the O-ring 60 respectively from one axial end part and another axial end part of the curved surface part 61. Accordingly, for example, when the user operates the teach button 18, and the shape of the O-ring 60 sealing the gap between the shaft 18b of the teach button 18 and the housing 12 changes due to friction, at least one of the planar surface parts 62 is in contact with the shaft 18b of the teach button 18 or a part of the housing 12. By contacting in this manner, it is possible to suppress excessive rotation of the O-ring 60 which seals between the shaft 18b and the housing 12, and it is possible to improve the sealing performance.

The embodiments described above are intended to facilitate understanding of the disclosure and are not intended to limit the interpretation of the disclosure. For example, in an electronic device that is not the photoelectric sensor 10 and includes a housing and a substrate (a substrate on which a control circuit is mounted), as described above, a setting part and a seal ring may be adopted. The setting part changes a setting of a sensor main body in response to an input operation from outside. The seal ring is provided to surround a shaft of the setting part and seals a gap between the shaft and the housing. The seal ring may have a curved surface part and a pair of end parts. The curved surface part is curved convexly in a cross-sectional view. The pair of end parts have a shape different from the curved surface part and extend along an axial direction of the sea ring on two sides of the curved surface part in the axial direction of the seal ring. Each element included in the embodiments and its arrangement, material, condition, shape, size, etc. are not limited to those exemplified herein and may be changed as appropriate. In addition, the configurations shown in different embodiments may be partially replaced or combined.

Appendix

1. A sensor 10, which is a sensor 10 including a housing 12 that houses at least one of a light projecting part 14 emitting light and a light receiving part 16 receiving light, the sensor 10 including:
    a setting part 18 changing a setting of a sensor main body in response to an input operation from outside and having a shaft 18b inserted into the housing 12; and
    a seal ring 60 in an annular shape, provided to surround the shaft 18b and sealing a gap between the shaft 18b and the housing 12,
    wherein the seal ring 60 has a curved surface part 61 that is curved convexly in a cross-sectional view, and a pair of end parts 62a and 62b that have a shape different from the curved surface part 61 and extend along an axial direction of the seal ring 60 on two sides of the curved surface part 61 in the axial direction of the seal ring 60.
6. An electronic device, which is an electronic device including a housing and a substrate housed in the housing and mounted with a control circuit, the electronic device including:
    a setting part 18 changing a setting of an electronic device main body in response to an input operation from outside and having a shaft 18b inserted into the housing; and
    a seal ring 60 in an annular shape, provided to surround the shaft 18b and sealing a gap between the shaft 18b and the housing,
    wherein the seal ring 60 has a curved surface part 61 that is curved convexly in a cross-sectional view, and a pair of end parts 62a and 62b that have a shape different from the curved surface part 61 and extend along an axial direction of the seal ring 60 on two sides of the curved surface part 61 in the axial direction of the seal ring 60.

What is claimed is:

1. A sensor, which is a sensor housing in a housing at least one of a light projecting part that emits light and a light receiving part that receives light, the sensor comprising:
    a setting part changing a setting of a sensor main body in response to an input operation from outside and having a shaft inserted into the housing; and
    a seal ring in an annular shape, provided to surround the shaft and sealing a gap between the shaft and the housing,
    wherein the seal ring has
        a curved surface part that is curved convexly in a cross-sectional view, and
        a pair of end parts that have a shape different from the curved surface part and extend along an axial direction of the seal ring, on two sides of the curved surface part in the axial direction of the seal ring,
    wherein when the shaft of the setting part moves in an axial direction in response to the input operation from outside, one of the pair of end parts is brought into contact with an outer circumferential surface of the shaft, and the other of the pair of end parts is brought into contact with a part of the housing.

2. The sensor according to claim 1, wherein the curved surface part and the pair of end parts are each formed of a same elastic material.

3. The sensor according to claim 1, wherein
    an inner circumferential surface of the pair of end parts is located more radially outward than an inner circumferential surface of the curved surface part in a cross-sectional view, and an outer circumferential surface of the pair of end parts is located more radially inward than an outer circumferential surface of the curved surface part in a cross-sectional view.

4. The sensor according to claim 3, wherein
one of the pair of end parts has a planar cross-sectional shape extending along a first direction from one axial end side of the curved surface part, and
the other of the pair of end parts has a planar cross-sectional shape extending along a direction opposite to the first direction from another axial end side of the curved surface part.

5. The sensor according to claim 3, wherein the curved surface part and the pair of end parts are each formed of a same elastic material.

6. The sensor according to claim 1, wherein
one of the pair of end parts has a planar cross-sectional shape extending along a first direction from one axial end side of the curved surface part, and
the other of the pair of end parts has a planar cross-sectional shape extending along a direction opposite to the first direction from another axial end side of the curved surface part.

7. The sensor according to claim 6, wherein the curved surface part and the pair of end parts are each formed of a same elastic material.

8. An electronic device, which is an electronic device comprising a housing and a substrate housed in the housing and mounted with a control circuit, the electronic device comprising:
a setting part changing a setting of an electronic device main body in response to an input operation from outside and having a shaft inserted into the housing; and
a seal ring in an annular shape, provided to surround the shaft and sealing a gap between the shaft and the housing,
wherein the seal ring has
a curved surface part that is curved convexly in a cross-sectional view, and
a pair of end parts that have a shape different from the curved surface part and extend along an axial direction of the seal ring, on two sides of the curved surface part in the axial direction of the seal ring,
wherein when the shaft of the setting part moves in an axial direction in response to the input operation from outside, one of the pair of end parts is brought into contact with an outer circumferential surface of the shaft, and the other of the pair of end parts is brought into contact with a part of the housing.

* * * * *